June 23, 1970 F. M. MAGALHAES 3,517,340

CIRCULATOR HAVING CONDUCTIVE POST CAPACITIVELY COUPLED BETWEEN FIRST AND SECOND TRANSMISSION LINE CONDUCTORS FOR BROADBANDING PURPOSES

Filed Dec. 23, 1968

INVENTOR
F. M. MAGALHAES
BY
Roderick B. Anderson
ATTORNEY

United States Patent Office 3,517,340
Patented June 23, 1970

3,517,340
CIRCULATOR HAVING CONDUCTIVE POST CAPACITIVELY COUPLED BETWEEN FIRST AND SECOND TRANSMISSION LINE CONDUCTORS FOR BROADBANDING PURPOSES

Frank M. Magalhaes, Berkeley Heights, N.J., assignor to Bell Telephone Laboratories, Incorporated, Murray Hill and Berkeley Heights, N.J., a corporation of New York Filed Dec. 23, 1968, Ser. No. 786,227
Int. Cl. H01p *1/32, 5/12*
U.S. Cl. 333—1.1 3 Claims

ABSTRACT OF THE DISCLOSURE

The bandwidth of a Y-junction stripline circulator is increased by including a conductive post that extends from the active conductor junction through the gyromagnetic disk to form a capacitance with the ground conductor. The capacitance is arranged with respect to the inductances of the active conductors and the conductive post to give series resonance at the center frequency of the circulator.

BACKGROUND OF THE INVENTION

This invention relates to microwave circulators, and more particularly, to Y-junction stripline circulators.

Circulators are fundamental microwave circuit components that are used to direct microwave energy from one transmission line to only one of a plurality of other lines. One of the popular circulator forms is the stripline, three-branch or Y-junction type, the basic principles and uses of which may be found in various texts such as "Microwave Ferrites and Ferrimagnetics," by B. Lax and K. J. Button, McGraw-Hill Book Company, 1962; in publications such as "Operation of the Ferrite Junction Circulator," by C. E. Fay and R. L. Comstock, IEEE Transactions, vol. 13 MT&T, pages 15–27, January 1965; and in patents such as the patent of Linn, 3,323,079 and the patent of Simon, 3,277,399.

The stripline Y-junction circulator usually comprises three active or center conductors which radiate from a common junction. The junction is located between a pair of nonconductive gyromagnetic elements, which in turn are located between opposite planar ground conductors. The gyromagnetic elements are magnetically polarized by an external magnet and constitute a nonreciprocal impedance with respect to incident microwave energy. Within a predetermined band of frequencies, the electric and magnetic field components of microwave energy incident on the junction from one active conductor will add in phase and be transmitted from the device on only one other conductor and substantially no energy will be reflected from the device along the other two conductors. For example, designating the three active conductors as ports 1, 2 and 3, microwave energy incident on port 1 will be transmitted from the circulator only on port 2, whereas microwave energy incident on port 2 will be transmitted from the circulator only through port 3.

Considerable effort has been made in increasing the bandwidth over which a circulator will circulate, or properly couple, incident microwave energy. Improvements which broaden the bandwidth of circulators, however, have invariably introduced other disadvantages, such as increasing the bulk and complexity of the device.

SUMMARY OF THE INVENTION

It is an object of this invention to increase the bandwidth of ferrite circulators.

It is an object of a specific embodiment of the invention to increase the bandwidth of stripline Y-junction circulators without substantially increasing their bulk or complexity.

In accordance with the invention, the bandwidth of a stripline circulator is increased by including a conductive post at the active conductor junction which extends through one of the gyromangetic disks and is coupled by a capacitor to one of the ground conductors.

The capacitor is designed with respect to the inductances of the active conductors and the conductive posts to give series resonance at the operating frequency of the circulator. With this arrangement, the bandwidth over which the device will circulate incoming microwave energy is substantially increased.

These and other objects, features and advantages of the invention will be better understood from a consideration of the detailed description taken in conjunction with the accompanying drawing.

DRAWING DESCRIPTION

DETAILED DESCRIPTION

Figure 1:
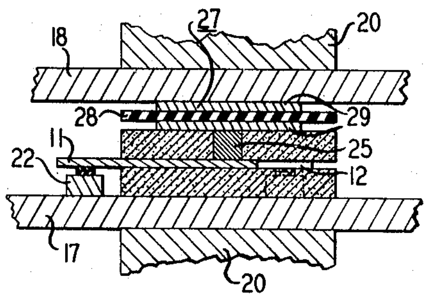
FIG. 1 is a partially sectioned schematic illustration of a circulator in accordance with an illustrative embodiment of the invention.
Figure 2:
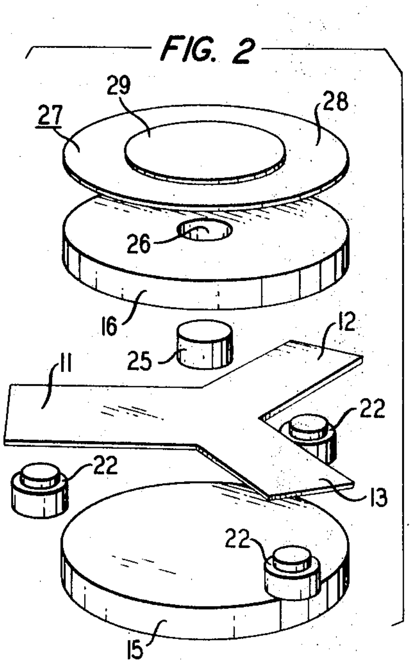
FIG. 2 is an exploded view of part of the circulator of FIG. 1.

Referring to FIGS. 1 and 2, there is shown a circulator comprising active conductors 11, 12, and 13 included between opposite gyromagnetic disks 15 and 16 which are made of an appropriate ferrite material. The disks in turn are included between opposite ground conductors 17 and 18, shown in FIG. 1. A magnet 20 external to the ground conductors 17 and 18 produces an appropriate magnetic field through the gyromagnetic disks 15 and 16. Capacitors 22 are included to provide an appropriate capacitance between the active conductors 11–13 and the ground conductors 17 to tune the circulator, in a known manner, to a desired center frequency. The purpose of the device is to properly couple microwave energy defined by high frequency electric and magnetic fields extending between the active conductor and the ground conductors.

The circulator works according to the same principles as stripline Y-junction circulators of the prior art. That is, the impedance of magnetically polarized gyromagnetic disks 15 and 16 creates a phase shift between electric and magnetic field components of mricowave energy incident on the device on active conductor 11 such that the fields add in phase and are transmitted from the device only on active conductor 12. However, because the impedance of the disks is nonreciprocal, microwave energy incident on active conductor 12 is not transmitted on conductor 11, but rather is transmitted on active conductor 13. Conductors 11, 12, and 13 correspond respectively to ports 1, 2, and 3 of the circulator.

In accordance with the invention, the bandwidth over which microwave energy will be properly circulated is increased by including at the junction of the active conductors a conductive post 25 which extends through an aperture 26 in gyromagnetic disk 16 to a capacitor 27 in contact with ground conductor 18. The capacitor comprises a disk 28 of an appropriate insulative material such as mica, having on opposite sides thin conductive layers 29.

Figure 3:
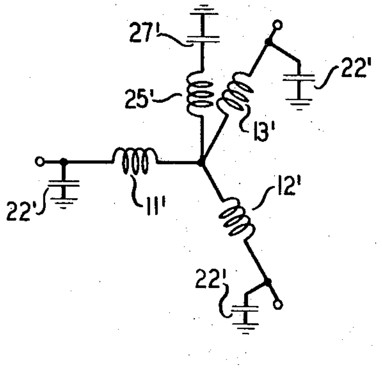
FIG. 3 is a circuit designation of the circulator of FIGS. 1 and 2.

FIG. 3 illustrates schematically the reactances of the various reactive components of the circulator of FIGS. 1 and 2. Inductors 11′, 12′ and 13′ represent the inductances of active conductors 11, 12, and 13, respectively, capacitors 22′ and 27′ represent the capacitances of capacitors 22 and 27 and inductor 25′ represents the inductance of conductive post 25.

In accordance with another feature of the invention, capacitance 27′ is designed to be of a proper value to give series resonance with inductors 11′, 12′, 13′, and 25′ at the center frequency of device operation. With this provision, it can be shown that the bandwidth of the device is substantially broadened. That is, with the inclusion of conductive post 25 and capacitor 27, the frequency range of microwaves that are properly circulated by the device is substantially larger than it would be in the absence of these elements. It can be appreciated that, while the bandwidth of the device has been increased, little has been sacrificed by way of increased bulk or complexity.

While, from the foregoing description, it is possible for one skilled in the art to make and use circulators that take advantage of the present invention, an appendix is included to explain in detail a preferred technique of construction. The appendix also describes in detail the criteria for optimum broadband circulator operation and the reasons why the additional series resonant circuit increases bandwidth.

Figure 4:
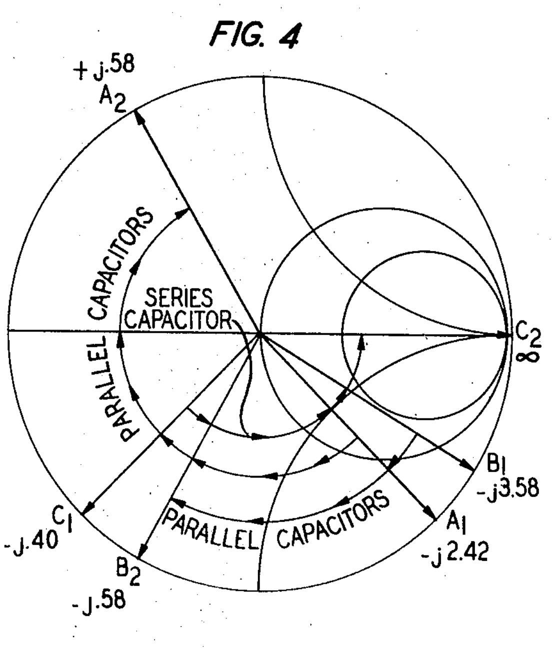
FIG. 4 is a Smith chart illustrating the construction and operation of the circulator of FIGS. 1 and 2.

The criteria for proper circulator operation will be summarized briefly with reference to FIG. 4, which shows a Smith chart including vectors $A_2$, $B_2$, and $C_2$ of equal length. Consider excitation A as being an excitation at which equal frequency and amplitude voltages are applied to the three ports of the circulator such that the voltage at port one has a phase angle of 0 degrees, the voltage at port two has a phase angle of −120 degrees and that port three has a phase angle of +120 degrees. Consider excitation B to be one in which the voltages at ports 1, 2, and 3 are 0 degrees, +120 degrees and −120 degrees, respectively; and excitation C designates a case in which the voltages applied to all three ports are in phase.

Vector $A_2$ is then defined as the admittance at port one with A excitation applied to the three ports, $B_2$ is the admittance at port one with B excitation, and $C_2$ is the admittance at port one with C excitation. As is known in the art, proper circulator action requires that, at the frequency of operation, the vectors $A_2$, $B_2$, and $C_2$ be substantially 120 degrees apart as is shown in FIG. 4. In the absence of the present invention, vectors $A_2$ and $B_2$ will rotate as the applied frequency deviates from the ideal center frequency, while vector $C_2$ will remain substantially stationary. With the inclusion of thte improvement described, however, vector $C_2$ will rotate with vectors $A_2$ and $B_2$ as the frequency is changed, thereby maintaining the required 120-degree angular separation angle of the vectors over a broader range than is normally the case. The appendix describes this phenomenon in greater detail.

The improvement which has been shown and described is intended to be merely illustrative of the concept of the invention. For example, the structural configuration of the circulator conductors could take various forms other than that shown. In principle, the conductive post 25 and the capacitor 27 could be interchanged such that the post contacts a ground conductor and is capacitively coupled to the active conductor junction. Various other modifications and embodiments may be made by those skilled in the art without departing from the spirit and scope of the invention.

APPENDIX

Three different voltage excitations are to be applied to the circulator for the purpose of characterizing the device and aiding in its construction. In each case the voltage applied at each of the three ports will have the same amplitude. Consider port one to be the reference port and that with any of the excitations, port one has a phase angle of 0 degree. A circulator excitation in which the voltage at port two has a phase angle of −120 degrees and that at port three has a phase angle of +120 degrees will be called excitation A. The case in which port two has a phase angle of +120 degrees and port three a phase angle of −120 degrees will be called excitation B. Excitation C designates a case in which the voltages at all three ports are in phase.

The reflected and incident voltages are related by $$\begin{bmatrix} V_{r1} \\ V_{r2} \\ V_{r3} \end{bmatrix} = \begin{bmatrix} S_{11} & S_{12} & S_{13} \\ S_{21} & S_{22} & S_{23} \\ S_{31} & S_{32} & S_{33} \end{bmatrix} \begin{bmatrix} V_{i1} \\ V_{i2} \\ V_{i3} \end{bmatrix} \quad (1)$$

where $V_{r1}$. $V_{r2}$, $V_{r3}$ are the reflected voltages from the three ports; $V_{i1}$, $V_{i2}$, $V_{i3}$ are the incident voltages at the same three ports; and $S_{11}$, $S_{12}$, etc., are the scattering coefficients of the circuit. As is described in the aforementioned book "Microwave Ferrites and Ferrimagnetics," the scattering matrix for an ideal three-port circulator takes the form $$\begin{bmatrix} S_{11} & S_{12} & S_{13} \\ S_{21} & S_{22} & S_{23} \\ S_{31} & S_{32} & S_{33} \end{bmatrix} = \begin{bmatrix} 0 & 0 & 1 \\ 1 & 0 & 0 \\ 0 & 1 & 0 \end{bmatrix} \quad (2)$$

For excitation A $$\begin{bmatrix} V_{i1} \\ V_{i2} \\ V_{i3} \end{bmatrix} = \begin{bmatrix} 1 \\ e^{-j2\pi/3} \\ e^{j2\pi/3} \end{bmatrix} \quad (3)$$

For excitation B $$\begin{bmatrix} V_{i1} \\ V_{i2} \\ V_{i3} \end{bmatrix} = \begin{bmatrix} 1 \\ e^{j2\pi/3} \\ e^{-j2\pi/3} \end{bmatrix} \quad (4)$$

For excitation C $$\begin{bmatrix} V_{i1} \\ V_{i2} \\ V_{i3} \end{bmatrix} = \begin{bmatrix} 1 \\ 1 \\ 1 \end{bmatrix} \quad (5)$$

To obtain the reflected voltage at port one for excitation A, Eqs. 2 and 3 are substituted into Eq. 1 yielding:

$$V_{r1A} = e^{2\pi/3} \quad (6)$$

Similarly, for excitation B $$V_{r1B} = e^{-j2\pi/3} \quad (7)$$

and for excitation C $$V_{r1C} = 1 \quad (8)$$

These values can be used to construct an admittance plot on a Smith chart as shown in FIG. 4. The three values shown in FIG. 4 as $A_2$, $B_2$, and $C_2$ are the values toward which the circulator design will be directed. Hereafter an A value will be the admittance obtained looking into port one with A excitation applied to the three circulator ports, a B value the admittance looking into port one with B excitation and a C value the admittance looking into port one with C excitation.

In accordance with my illustrative technique, the first step in the construction of the circulator is to make the circulator with the inductive post extending all the way to the ground conductor, and adjusting the inductive circuit to give values indicated by $A_1$, $B_1$, and $C_1$ in FIG. 4. For simplicity the losses have been neglected in FIG. 4. Losses merely shorten the length of the arrows. It is desirable to use only a single lumped parallel capacitance at each port to tune the A and B values to their final positions because additional tuning elements tend to narrow the bandwidth of the circulator. If only parallel capacitors are to be used, the A value should differ from the B value by at least a susceptance of 1.15; otherwise 120-degree separation may not be achieved between these values. The width of the conductors, the size and shape of the ferrite, and the magnetic bias field are adjusted to obtain this susceptance difference of 1.15 between A and B values.

The next step is to tune out the reactances in the circuit to bring the A, B, and C values to their final positions, 120 degrees apart from each other. The C value is brought to infinite susceptance, $C_2$ in FIG. 4, by breaking the inductive circuit at the point between the center post and the ground plane and inserting a series capacitor at this point. Since the A and B excitation voltages cancel at the center of the circulator structure, this series capacitor does not affect the A and B values. The A and B values are rotated into position by connecting an appropriate capacitor between the center conductor and the ground plane where each arm of the Y enters the ferrite. With this adjustment, in a typical constructed device, the A value was moved to a susceptance of +0.58, $A_2$ in FIG. 4, and the B value was moved to a susceptance of −0.58, $B_2$ in FIG. 4. The C value is essentially unaffected by this added susceptance because an addition to infinite or near infinite susceptance is not detectable. The circuit now fulfills the previously set criteria for a circulator: that its A value be $A_2$, its B value be $B_2$, and its C value be $C_2$ in FIG. 4.

The series capacitor mentioned above has an additional important function in the circuit. In circuit configurations used by previous investigators there was little net magnetic field in the ferrite for the C excitation. As a result the C value is very near infinite susceptance and changes very little with changes in frequency. The present configuration, on the other hand, has some net magnetic field for C excitation. The magnetic fields due to the excitation at each port cancel only at the center of the ferrite disks because they are not uniformly distributed over the whole ferrite volume. At first glance this might seem to be a disadvantage. However, it allows the use of a single series capacitor to form a broadbanding circuit. The circulator inductances series resonate with the single capacitor form a circuit which causes the C value to move with frequency in much the same manner as the A and B values, thus retaining near 120-degree separation between the values over a considerable frequency range.

In a specific device which has been built, yttrium aluminum iron garnet (YAIG) material with a saturation magnetization of 1010 gauss was used for the ferrite structure. The disks were 0.250 inch in diameter and 0.050 inch thick. The ferrite was biased above ferrimagnetic resonance with a magnetic field of 1100 oersteds intensity. The Y-shaped copper conductor between the ferrite disks had arms 0.120 inch wide and 0.003 inch thick. The center post between the Y and ground was made of copper wire 0.025 inch in diameter. The series capacitor which was made with mica dielectric had a capacitance of 1.1 pf. Ceramic dielectric was used for the three parallel capacitors. Their capacitances were 8 pf. each.

The isolation or insertion loss against the preferred direction of rotation was measured and the worst case showed a 20 db isolation bandwidth of 10 percent centered on 1225 mHz. with a maximum of 28 db isolation. In a similar manner the insertion loss in the preferred direction of rotation was measured and plotted. The insertion loss was about 2 db over a 10 percent band centered on 1180 mHz. These losses may be improved by removing ferrite material from those parts of the circuit where it is not essential for circulator action. The input impedance match was measured and plotted. Over the 10 percent band centered in 1225 mHz., the voltage standing wave ratio (VSWR) was found to be below 1.4 with a minimum of 1.08 at 1150 mHz.

What is claimed is:

1. In a Y-junction circulator of the type comprising a first conductor having at least first, second and third branches connected to a common junction, at least one second conductor parallel to and coextensive with the first conductor, said first and second conductors being capable of together propagating high frequency electromagnetic wave energy, at least one member of gyromagnetic material, said member included between the junction and the second conductor, means for producing a magnetic field through the gyromagnetic member in a direction transverse to the direction of wave propagation by the conductors, the parameters of the circulator being arranged such that electromagnetic wave energy in a band centered about a frequency $f$ transmitted by the first branch toward the junction is directed substantially only to the second branch and such energy transmitted by the second branch toward the junction is directed substantially only to the third branch, the improvement comprising:

means for increasing said band of frequencies that may be circulated by the circulator comprising a conductive post extending through the gyromagnetic member and being coupled to the junction and the second conductor;

one of said couplings being a direct connection;

and the other coupling being a capacitive coupling.

2. The improvement of claim 1 wherein:

the conduction post capacitive coupling is characterized by a capacitance that forms with the inductances of the three first conductor branches and the conductive post a series circuit which is resonant at substantially said center frequency $f$.

3. The improvement of claim 2 wherein:

the conductive post is directly connected to the first conductor junction and capacitively coupled to the second conductor.

References Cited

UNITED STATES PATENTS

| | | | |
|---|---|---|---|
| 3,165,711 | 1/1965 | Drumheller et al. | 333—1.1 |
| 3,174,116 | 3/1965 | Sur | 333—1.1 |
| 3,422,375 | 1/1969 | Omori | 333—1.1 |

HERMAN KARL SAALBACH, Primary Examiner

P. L. GENSLER, Assistant Examiner

U.S. Cl. X.R.

333—84